United States Patent
Cohen-Solal

(10) Patent No.: US 7,284,201 B2
(45) Date of Patent: Oct. 16, 2007

(54) USER ATTENTION-BASED ADAPTATION OF QUALITY LEVEL TO IMPROVE THE MANAGEMENT OF REAL-TIME MULTI-MEDIA CONTENT DELIVERY AND DISTRIBUTION

(75) Inventor: Eric Cohen-Solal, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 696 days.

(21) Appl. No.: 09/956,660

(22) Filed: Sep. 20, 2001

(65) Prior Publication Data

US 2003/0052911 A1   Mar. 20, 2003

(51) Int. Cl.
    *G06F 17/00* (2006.01)
(52) U.S. Cl. ..................... 715/738; 715/863
(58) Field of Classification Search .............. 345/716, 345/738, 744, 863; 715/730, 716, 738, 744, 715/863, 763
See application file for complete search history.

(56) References Cited

U.S. PATENT DOCUMENTS

| | | | |
|---|---|---|---|
| 5,561,718 A | | 10/1996 | Trew et al. ................ 382/118 |
| 5,774,591 A | * | 6/1998 | Black et al. ............... 382/236 |
| 5,892,754 A | | 4/1999 | Kompella et al. .......... 370/236 |
| 6,072,494 A | * | 6/2000 | Nguyen ..................... 715/863 |
| 6,128,397 A | | 10/2000 | Baluja et al. .............. 382/118 |
| 6,154,559 A | | 11/2000 | Beardsley .................. 382/103 |
| 6,232,974 B1 | * | 5/2001 | Horvitz et al. ............. 345/419 |
| 6,324,573 B1 | * | 11/2001 | Rhoads ...................... 709/217 |
| 6,421,064 B1 | * | 7/2002 | Lemelson et al. ......... 345/688 |
| 6,437,758 B1 | * | 8/2002 | Nielsen et al. ............. 345/8 |
| 6,453,336 B1 | * | 9/2002 | Beyda et al. .............. 709/204 |
| 6,578,962 B1 | * | 6/2003 | Amir et al. ................ 351/209 |
| 6,750,880 B2 | * | 6/2004 | Freiberger et al. ......... 345/730 |

FOREIGN PATENT DOCUMENTS

EP         0990416 A1    5/2000

OTHER PUBLICATIONS

Fujikawa et al: "A quality control mechanism for networked virtual reality system with video capability" Multimedia Computing And Systems, 1998. Proceedings. IEEE International conference On Austin, TX, USA, Jun. 28-Jul. 1, 1998, Los Alamitos, CA, USA, IEEE Comput. Soc, US, Jun. 28, 1998, pp. 214-217.

(Continued)

*Primary Examiner*—Kristine Kincaid
*Assistant Examiner*—Thanh Vu
(74) *Attorney, Agent, or Firm*—Paul Im

(57) ABSTRACT

A method for transmitting a stream of multi-media content from provider server to a user device includes transmitting multi-media content from the provider server to the user device via a communication network and outputting the multi-media content from the user device to a user via an output on the user device such that the multi-media content is delivered from the provider server to the user in real-time. A degree of attention that the user directs to the output of the user device is continuously determined during the transmission and a parameter adjusting module at the provider server adjusts a parameter of the multi-media content in response to the degree of attention.

18 Claims, 1 Drawing Sheet

OTHER PUBLICATIONS

Ishibashi et al: "Adaptive QoS control for video and voice traffic in networked virtual environments" Computer Communications And Networks, 2000. Proceedings. Ninth International Conference On Las Vegas, NV, USA Oct. 16-18, 2000, Piscataway, NJ, USA, IEEE, US, Oct. 16, 2000, pp. 638-642.

Haritaoglu et al., "*Hydra*" Multiple People Detection and Tracking Using Silhouettes IEEE, Apr. 1999, pp. 6-13.

Iwasawa et al., "Real-Time, 3D Estimation of Human Body Postures from Trinocular Images" ATR Media Integration and Communications Research Laboratories.

VISIOBOARD, Metrovision Web Page, printed on Jul. 18, 2001.

LC Technologies, Inc., "Eye Development System—For Human Factors Research", Eyegaze Web Page, printed Jul. 18, 2001.

* cited by examiner

USER ATTENTION-BASED ADAPTATION OF QUALITY LEVEL TO IMPROVE THE MANAGEMENT OF REAL-TIME MULTI-MEDIA CONTENT DELIVERY AND DISTRIBUTION

BACKGROUND OF THE INVENTION

1. Field of the Invention

The present invention relates to a method for managing multi-media content for real-time distribution and transmission to a user.

2. Description of the Related Art

The demand for real-time transmission of multi-media content for video-on-demand and internet-related applications is increasing. Accordingly, distribution of real-time multi-media content is on the rise, and the new multi-media content will have a larger variety of content types.

Multi-media content may be accessed via user pull applications and provider broadcast applications. In the user pull applications, the user manually selects the content to be remotely accessed. In the provider broadcast applications, the real-time multi-media content is distributed to all users, and the users locally select what is to be accessed, such as, for example, via a set top box of a cable television system. New ways of accessing multi-media content (discussed in further detail below) are constantly being developed for professional, commercial, and consumer applications.

The real-time multi-media content delivery is delivered via a network, such as the Internet or a cable television system, to users connected to the network. Users may be connected to the network via high bandwidth connections (i.e., DSL and cable connections) or low bandwidth connections (i.e. wireless links). Furthermore, the users use many different types of stations to access the network, including mobile stations, such as mobile phones, pagers, and Personal Digital Assistants, and work stations, such as Personal Computers and network terminals.

The provider uses equipment connected to one or more networks to provide the multi-media content on demand to the user. However, the provider's equipment and the transmission path between the provider and the user each have a limited capacity. Once the provider is transmitting at the full capacity of the equipment in the transmission path, the provider must either make itself unavailable to further users or increase the capacity of the equipment. Known solutions to the scalability issues are limited by the available bandwidth to each user based on the capacity of the equipment.

SUMMARY OF THE INVENTION

An object of the present invention is to provide a method of adjusting a parameter of multi-media content for real-time transmission.

The object of the present invention is achieved by determining the degree of attention of the user to the multi-media content during the real-time delivery of the multi-media content and adjusting a parameter of the multi-media content accordingly. The present invention takes advantage of the attention that a user directs to the multi-media content during the real-time delivery thereof. A user may watch, read, or listen to parts of the multi-media content but not intensely look at the content at other times. Instead, the user may perform other activities in parallel or simply be uninterested in a particular segment of the multi-media content. During these times of relative inattentiveness, the user does not pay full attention to the multi-media and may even leave the proximity of the output device displaying the multi-media content. Furthermore, the user may only be interested in a particular portion of what is displayed on the output device such that the attention of the user is focussed on a small portion of the display. As a consequence of the varying degree of attention, the multi-media content may be managed by adapting the quality level of the delivered content in response to the detected degree of attention of the user in the multi-media content.

In a preferred embodiment, the quality level of the multi-media content is reduced, thereby lowering the rate of data delivery of the multi-media content, when it is determined that the user's attention is diverted from the content, thereby increasing the available bandwidth. As a result, more bandwidth is available during periods of lower attention by that user for other potential users. The reduction in quality level to a particular user may, for example, be achieved by reducing the resolution of a video and/or audio portion of the output during periods of detected lower attention by the user.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
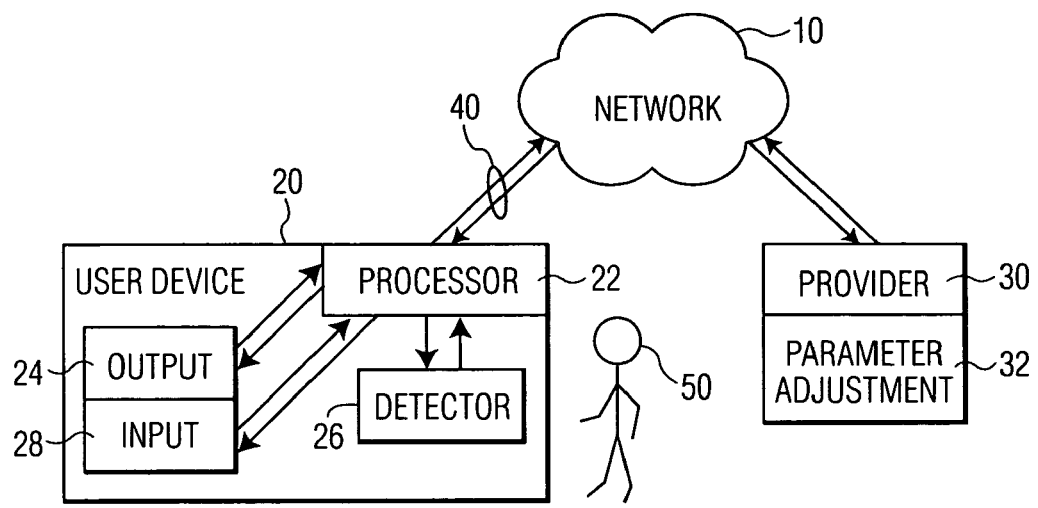
FIG. 1 is a schematic diagram showing a system for distributing multi-media content in real-time.

A user device 20 according to the present invention is shown in FIG. 1. The user device 20 is connectable to a communication network 10 via a connection 40 which may be a wired or wireless connection. The user device 20 may be any known component that is capable of connecting to the communication network 10 such as, for example, a television set-top box, a mobile phone, a Personal Digital Assistant (PDA), a pager, a computer, and a network workstation. The network 10 may, for example, include a video-on-demand provider such as cable/satellite television system or the Internet. A provider server 30 such as a television provider or an internet server is connected to the network 10. A user may desire to access a multi-media content that is delivered in real-time from the provider server 30 using the user device 20. The real-time transmission of data may be initiated by the user (i.e., a user pull arrangement) by remotely selecting the content to be activated such as by selecting a multi-media download from a web page. Alternatively, the multi-media content may be distributed by the provider server 30 via a broadcast transmission so that the user locally selected whether to access the content such as a cable television broadcast selected by a user on a set-top box.

The user device 20 includes an input 28, an output 24, and a processor 22. The input 28 may include a keyboard, a mouse, a remote control device, or any other device that allows the user to input commands for controlling the user device 20. The output device 24 may include a display and speakers and any other device necessary for presenting the multi-media content to the user such as, for example, virtual reality devices which allow the user to feel the output. The input 28 and output 24 are connected to the processor 22, i.e., a microprocessor, which controls these devices.

The constant stream of data required for real-time delivery of the media content requires the use of a bandwidth which cannot be used by another user for the duration of the realtime delivery of the media content. In many instances, a user will not direct his entire attention to the output of the multi-media content for the duration of the output. The use of the entire bandwidth during the time that the user is not fully attentive is an inefficient use or waste of bandwidth which may be used for other users. To maximize the use of the bandwidth, the present invention includes a detector 26 connected to the user device 20 for detecting when the user is not attentive to the multi-media content. The detector 26 may comprise a separate part connected with the user device 20 or may comprise an integral piece thereof. When the detector determines that the user is inattentive, the detector 26 outputs a signal which is transmitted through the network 10 to the provider server 30. The signal output by the detector 26 may be a one bit signal which signals either an attentive state or a not attentive state. In more complex embodiments which will be described below, the signal output may be greater than one bit.

A parameter adjustment module 32 in the provider server 30 manages the data stream of the multi-media content so that the bandwidth used to transmit the multi-media content is reduced during periods of inattentiveness. The parameter adjustment module 32 may, for example, comprise a software module of the provider server 30.

To manage the data, the parameter adjustment module 32 may reduce the resolution (quality level) of a video signal while maintaining the quality of an audio signal being transmitted to the user device 20. Alternatively, the quality of the video signal may be maintained and the quality of the audio signal may be reduced (This may be applicable if the user device is a television for which the audio output has been muted). The reduction in resolution reduces the amount of information that is required to be transmitted per unit of time, i.e., the rate of transmission, thereby increasing the available bandwidth along the route between the provider server 30 and the user device 20. Since the data stream of multi-media content is being delivered in real-time, once the user returns to an attentive state, parameter adjustment module 32 no longer receives the not attentive signal and the provider server 30 may immediately resume the normal quality level of data transmission. Accordingly, the user is not aware of the changes in the quality level of the multi-media content. Furthermore, the parameter adjustment module 32 may include a time delay such that the user must be inattentive for a duration of the time delay before the parameter adjustment module reduces the resolution.

The detector may alternatively or additionally monitor the status of a screensaver of the user device 20. In this embodiment, the detector 26 outputs a not attentive signal when the screen saver is turned on and while the screensaver remains on.

While the management of the data stream of multi-media content is preferably automatic, the input 28 may also be used to send commands to the parameter adjustment device 32. For example, if a user wants to download and/or save a particular multi-media content item displayed with other multimedia items, the user may want the highest quality to be saved in the fastest possible time without having to sit and watch the other multimedia content items in high resolution while this is occurring. In this case, the user can use the input 28 to override the parameter adjustment module 32. The input device 28 could also be used to manually toggle between normal mode and the lower quality mode (i.e., a bandwidth saving mode). Alternatively or additionally, the input device 28 could be used to adjust the parameters that determine when the quality of the displayed signal is outputted, such as adjusting the time of onset after non-attentiveness of the user is detected.

To determine attentiveness, the detector 26 may detect the presence or not of a person. The presence of a person may be determined by evaluating an image of an area in front of the user device 20 and determining whether a silhouette of the person is in the detector image. This method of detecting the presence of a person is disclosed for example in Hydra, *Multiple People Detection and Tracking Using Silhouettes*, Haritaoglu, D. Harwood, L. Davis, Computer Vision and Pattern Recognition (CVPR 1999) Second Workshop of Video Surveillance. In a simple embodiment of the present invention, the presence of a silhouette indicates attentiveness and the absence of silhouette indicates non-attentiveness.

The detection of the presence of a person by the detector 26 may be performed in many different ways. The detector 26 detects an image of the room, analyzes the image for specific characteristics such as shapes, colors, and motions, and compares the characteristics of the image to a model to determine if a person is present. The characteristics may comprise a shape such as the silhouettes described above, colors such as skin tones, and/or specific motions of people such as a gait. The model may comprise any characteristic of a person which indicate the presence of a person.

As an alternative or in addition to comparing the image to a model, the detector 26 may also comprise a motion detector such as those used in security systems to detect motion. In this embodiment, the detection of motion indicates human activity in the room. The motion alone could indicate attentiveness or the device may use further detection as described below to further define the degree of attentiveness.

Furthermore, the distance between a user and the system may also be used to evaluate attentiveness. In this embodiment, the attentiveness of the user decreases as the distance from the user device increases. As a user moves further away from the user device 20, the user does not require as high a level of quality. To evaluate the distance of a user from the user device 20, the size of the silhouette or the apparent height of the silhouette in the detector image may be evaluated. In this embodiment, a certain distance may be defined past which point the user is deemed inattentive. Alternatively, the level of quality of the signal sent to the user device 20 may be gradually reduced as the distance from the user and the user device 20 increases.

The silhouette may be further analyzed to determine the orientation of the body. That is, the user is considered to be attentive if the body of the user faces the user device and is considered inattentive of the user faces away from the user device.

Of course, it is possible for the face of the user to be facing the display while the body is not facing the display. In that case, the head orientation must be detected to determine whether the user is actually watching the screen. Known methods for determining the head orientation may be used such as the methods disclosed by S. Iwasawa, J. Ohya, K. Takahashi, T. Sakaguchi, S. Kawato, K. Ebihara, and S. Morishima, *Real-time 3D Estimation of Human Body Postures from Trinocular Images*, ICCV '99. Using these techniques, the presence, distance, and orientation are all used to assess the degree of attention of the user.

Further techniques for tuning the content of information to an audience based on characteristics of the audience is disclosed in U.S. patent application Ser. No. 09/603,532, entitled "Method and Apparatus for Tuning Content of Information Presented to an Audience", the entire contents of which are expressly incorporated herein by reference. The techniques disclosed in this application are directed toward an audience. However, some of the techniques used for determining the characteristics of the audience could be applied to the present invention to determine information about the user's attention to the media.

Figure 2:
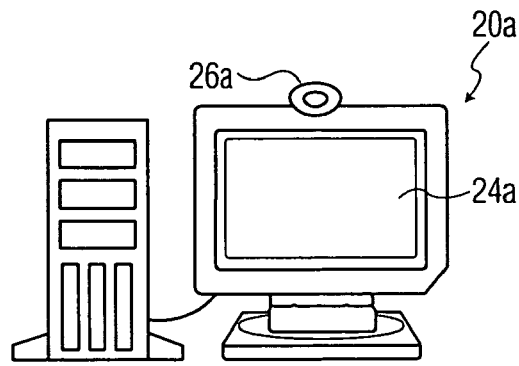
FIG. 2 is a front view of a user device according to an embodiment of the present invention.

FIG. 2 shows an embodiment of a user device 20a in which the detector 26a is arranged for determining the head orientation and/or the gaze of the user 50 relative to the output 24a which comprises a display screen. For purposes of this application, head orientation relates to the head pose of an individual and the gaze of a user relates to the direction in which the user's eyes are looking. The determination of the orientation or gaze may be effected using Computer Vision techniques such as, for example, the Computer Vision techniques disclosed in U.S. Pat. Nos. 6,154,559 and U.S. Pat. No. 5,561,71, the entire contents of which are incorporated herein by reference. In this embodiment, the detector 26a may comprise a camera or an infrared detector which uses at least one of the following techniques for determining head orientation: detecting facial features using geometrical reasoning, applying a 3-D model to perform a fitting operation, learning 2-D or 3-D facing/not facing models, and detection of skin tone percentage inside the face. These techniques all are used to determine the pose of a user's head. For example, the facial features detected, fitting operation, and facing/not facing models are used to determine (1) whether a user's head is present and (2) the orientation of a user's head. Furthermore, the detection of skin tone percentage also gives and indication of whether the user is present and the orientation of the user's head. The skin tone percentage is highest when the user is facing the output 24a. When a user turns his head away, the side or back of the user's head faces the output 24a and detector 26a so that a lower skin tone percentage is detected. From this information, the detector 26a determines whether the user is facing the output, i.e., is attentive.

Figure 3:
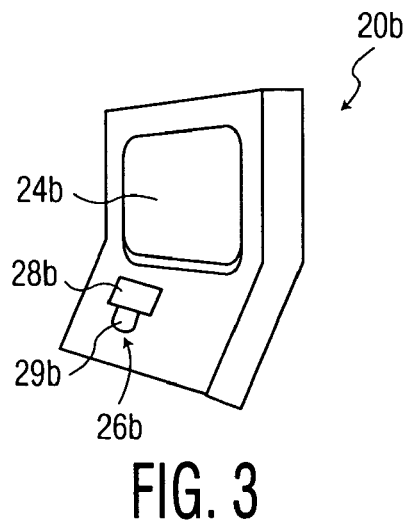
FIG. 3 is a perspective view of a user device according to another embodiment of the present invention.

The detector 26a may also be used for tracking the gaze of a user's eye to determine a location on the output device 24a where the user's attention is directed. In this embodiment, the detector 26a may comprise a single camera or infrared detector connected to a processor such as the detector of the Eyegaze Development System from LC Technologies, Inc. (Fairfax, Va.). In a further embodiment shown in FIG. 3, a detector 26b may also comprise a two camera system in which a "head" camera 28b determines a location of user's head and an "eye" camera 29b focuses on the eye based on the output from the head camera such as the Visioboard gaze communication system from Metrovision (Pérenchies, FR). In addition to the techniques mentioned above for detecting head orientation, the eye tracking embodiment also detects eye features and uses geometrical reasoning and learning techniques to adapt to a specific user during a calibration phase. This enables the detector 26b to determine the direction in which the user's eyes are looking.

In the eye tracking embodiment, the parameter adjustment device 32 may reduce the quality level of the video content in the areas of the output to which the user is not paying attention. For example, if the user is only looking at a lower left hand part of a screen, the parameter adjustment device 32 may reduce the quality level of the video content in the other quadrants of the screen so that only one fourth of the screen is delivered in the highest quality. The parameter adjustment device 32 may include a time delay so that it only makes this reduction after the user's gaze has been fixed on a certain portion of the screen for the duration of the time period of the time delay. Once the user, moves his gaze to the remainder of the output, the entire multi-media output is transmitted at the highest quality. In this embodiment, the not-attentive signal output by the detector must include an indication of where the user is not attentive. Accordingly, to include this location information, the not-attentive signal must be greater than one bit.

This embodiment may also include an manual override for the parameter adjustment device 32 in which the user can use the input 28 to maintain the high quality of the transmission even when the user moves out of range or out of view from the detector 26b. Alternatively, if a user knows ahead of time which portion of the multi-media content is of interest, the user may instruct the parameter adjustment device 32 to maintain the high quality transmission for that particular portion. The input 28 may also be used to manually return to the high quality transmission at the user's request during the transmission of the data stream of the multi-media content.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for distributing multi-media content in real-time, comprising the steps of:
   (a) transmitting a stream of multi-media content from a provider server to a user device via a communication network and outputting the multi-media content on the user device in real-time;
   (b) continuously determining a degree of attention that a user directs to the output of the user device during said step (a); and
   (c) adjusting, at the provider server, a parameter of the multi-media content transmitted in said step (a) in response to the degree of attention determined in said step (b), wherein said step (c) comprises reducing a quality level of at least a portion of the multi-media content to reduce a bandwidth required for said step (a), wherein said step (b) further comprises sending a not attentive signal to the provider server when it is determined that the user's attention is not directed to the output of the user device, and said step (c) comprises adjusting the parameter to a reduced quality level when the not attentive signal is present and adjusting the parameter to a normal quality level when the not attentive signal is not present, wherein said reducing is selectively performed to reduce quality of an audio signal while maintaining quality of a video signal, or to reduce quality of said video signal while maintaining said quality of said audio signal.

2. The method of claim 1, wherein said reducing is selectively performed based on a mute state of a television.

3. A method for distributing multi-media content in real-time, comprising the steps of:
(a) transmitting a stream of multi-media content from a provider server to a user device via a communication network and outputting the multi-media content on the user device in real-time;
(b) continuously determining a degree of attention that a user directs to the output of the user device during said step (a), said determining comprising measuring a distance between the user and the user device; and
(c) adjusting, at the provider server, a quality level of the multi-media content transmitted in said step (a) in response to the degree of attention determined in said step (b), wherein said quality level is reduced as said distance increases.

4. The method of claim 3, wherein the reduction of quality level with distance is gradual.

5. A method for distributing multi-media content in real-time, comprising the steps of:
(a) transmitting a stream of multi-media content from a provider server to a user device via a communication network and outputting the multi-media content on the user device in real-time at a normal quality level;
(b) continuously determining a degree of attention that a user directs to the output of the user device during said step (a); and
(c) adjusting, at the provider server, a parameter of the multi-media content transmitted in said step (a) in response to the degree of attention determined in said step (b), wherein said step (c) comprises reducing a quality level of at least a portion of the multi-media content to reduce a bandwidth required for said step (a), wherein said step (b) further comprises sending a not attentive signal to the provider server when it is determined that the user's attention is not directed to the output of the user device, and said step (c) comprises adjusting the parameter to a reduced quality level when the not attentive signal is present and adjusting the parameter to the normal quality level when the not attentive signal is not present, wherein said reducing is selectively performed to reduce quality of an audio signal while maintaining quality of a video signal, or to reduce quality of said video signal while maintaining said quality of said audio signal.

6. The method of claim 5, wherein the determining the degree of user attention in step (b) comprises at least one of detecting skin tone percentage inside the face of the user and observing a gait of the user.

7. The method of claim 5, wherein the determining the degree of user attention in step (b) comprises at least one of applying a 3-D model to perform a fitting operation, learning 2-D facing and not facing models, and learning 3-D facing and not-facing models.

8. The method of claim 5, wherein said step (c) comprises reducing a quality level of at least a portion of one of an audio content and a video content of the multi-media content.

9. The method of claim 8, wherein said step (b) comprises determining areas on an output display where a user's attention is directed and defining all other areas as non-attentive areas and the reduced quality level of at least a portion of one of an audio content and a video content is a reduced quality of the video content of the multi-media content in the non-attentive areas of the output display.

10. The method of claim 5, wherein the user device has an input for receiving a user command and the method further comprises the step of adjusting, at the provider server, a parameter of the multi-media content transmitted in said step (a) in response to a user command entered at the input.

11. The method of claim 5, wherein in said step (b) determining the degree of user attention comprises determining one of a distance of the user from the user device and a body orientation of the user.

12. The method of claim 5, wherein said reducing is from a normal quality level, and wherein said step (c) comprises, to keep the user from noticing change in said quality level, immediately resuming transmission at said normal quality level upon detecting that said user, after not being attentive to said output, has resumed being attentive to said output.

13. A system for distributing multi-media content over a network in real-time, comprising:
a plurality of detectors, each detector being configured for determining a degree of attention of a respective user to a respective user device, the user device being connected to said network for receiving a respective stream of multi-media content from a provider server and outputting the multi-media content to the respective user in real-time, the provider server being connected to the network for transmitting the stream of multi-media content in real-time to the respective user device at a normal quality level; and
a parameter adjusting module at said provider server for adjusting a parameter of the multi-media content being transmitted in response to the degree of attention determined by said detector, wherein said parameter adjusting module reduces a quality level of at least a portion of said stream of multi-media content being transmitted to said user device in response to a reduced degree of attention determined by said detector such that a bandwidth required for transmitting said stream of multi-media content is reduced to a lower quality level than the normal quality level, wherein said reducing is selectively performed to reduce quality of an audio signal while maintaining quality of a video signal, or to reduce quality of said video signal while maintaining said quality of said audio signal.

14. The system of claim 13, wherein said detector is operatively arranged for continually outputting a not attentive signal while it is determined that the user's attention is not directed to at least a portion of the output of the user device, so that lack of said not attentive signal immediately indicates attention by said respective user.

15. The system of claim 13, wherein said user device comprises an input for receiving a user command and said parameter adjusting module is arranged for adjusting a parameter of the multi-media content being transmitted in response to the user command.

16. The system of claim 13, wherein said detector detects a distance of said respective user from said respective user device.

17. A system for distributing multi-media content over a network in real-time, comprising:
- a detector for determining a degree of attention of the user to a user device, the user device being connectable to a network for receiving a stream of multi-media content from a provider server and outputting the multi-media content to a user in real-time, the provider server being connected to the network for transmitting the stream of multi-media content in real-time to the user device at a normal quality level; and
- a parameter adjusting module at said provider server for adjusting a parameter of the multi-media content being transmitted in response to the degree of attention determined by said detector, wherein said adjusting comprises:
  a) reducing a quality level of at least a portion of the output of the user device, from the normal quality level, wherein said reducing is selectively performed to reduce quality of an audio signal while maintaining quality of a video signal, or to reduce quality of said video signal while maintaining said quality of said audio signal; and
  b) to keep the user from noticing change in said quality level, immediately resuming transmission at said normal quality level upon detecting that said user, after not being attentive to said output, has resumed being attentive to said output.

18. A system for distributing multi-media content over a network in real-time, comprising:
- a detector for determining a degree of attention of the user to a user device, said determining comprising measuring a distance between the user and the user device, the user device being connectable to a network for receiving a stream of multi-media content from a provider server and outputting the multi-media content to a user in real-time at a normal quality level, the provider server being connected to the network for transmitting the stream of multi-media content in real-time to the user device; and
- a parameter adjusting module at said provider server for adjusting a quality level of the multi-media content being transmitted in response to the degree of attention determined by said detector, wherein said user device has a screensaver mode and said parameter adjustment module is arranged for adjusting said quality level of the multi-media content to a lower quality level when the user is in the screensaver mode, said adjusting selectively performed to reduce quality of an audio signal while maintaining quality of a video signal, or to reduce quality of said video signal while maintaining said quality of said audio signal.

* * * * *